United States Patent

Yoshikawa et al.

Patent Number: 5,448,219
Date of Patent: Sep. 5, 1995

[54] INDICATING APPARATUS FROM PREVENTING VEHICLES FROM COLLIDING WITH EACH OTHER AS THEY PASS

[75] Inventors: Takashi Yoshikawa; Noriko Horibata, both of Kawasaki, Japan

[73] Assignee: Matsushita Electric Industrial Co., Ltd., Osaka, Japan

[21] Appl. No.: 344,705

[22] Filed: Nov. 21, 1994

Related U.S. Application Data

[63] Continuation of Ser. No. 899,842, Jun. 17, 1992, abandoned.

Foreign Application Priority Data

Jul. 24, 1991 [JP] Japan .................................. 3-184405

[51] Int. Cl.6 ............................ B60Q 1/00; G08G 1/07
[52] U.S. Cl. .................................... 340/436; 340/905; 340/917; 340/919
[58] Field of Search ............... 340/436, 905, 928, 917, 340/919, 908, 908.1

[56] References Cited

U.S. PATENT DOCUMENTS

| | | | |
|---|---|---|---|
| 3,302,168 | 1/1967 | Gray et al. | 340/932 |
| 3,588,805 | 6/1971 | Davin | 340/928 |
| 4,727,371 | 2/1988 | Wulkowicz | 340/905 |

Primary Examiner—Donnie L. Crosland
Attorney, Agent, or Firm—Spencer, Frank & Schneider

[57] ABSTRACT

An indicating apparatus for preventing vehicles from colliding with each other as they pass an intersection of roads includes a vehicle sensing device placed on one of the roads a predetermined distance from the intersection for sensing a vehicle approaching the intersection, an alarm indicating device placed at the predetermined point on the other road, and a control device for causing the alarm indicating device to indicate alarm when the vehicle sensing device detects a vehicle approaching the intersection.

15 Claims, 3 Drawing Sheets

INDICATING APPARATUS FROM PREVENTING VEHICLES FROM COLLIDING WITH EACH OTHER AS THEY PASS

This application is a Continuation of application Ser. No. 07/899,842, Filed Jun. 17, 1992, abandoned.

BACKGROUND OF THE INVENTION

The present invention relates to an indicating apparatus for preventing vehicles from colliding with each other as they pass through a quiet intersection having no traffic lights and poor visibility due to buildings, trees, etc.

At most cross-shaped or T-shaped intersections having no traffic lights, a "STOP" traffic sign post is provided in a road where temporary stop must be effected so that a vehicle in the road must stop temporarily.

However, such traffic signs are not always effective enough to make drivers stop their vehicles temporarily to watch for other traffic. For example, a driver may fail to notice such a traffic sign or may ignore it out of habit because he usually passes through the intersection safely by car. Such cases may result in a collision of a vehicle with another vehicle coming along the other road of the intersection as they pass through the intersection.

SUMMARY OF THE INVENTION

The present invention is intended to solve the above problems. It is an object of the present invention to provide an indicating apparatus for preventing vehicles from colliding with each other as they pass, which is provided at an intersection with no traffic lights and which informs a driver of another vehicle approaching the intersection along the other road to prevent vehicle collision.

To achieve the object of the present invention, there are provided a sensing device for sensing a vehicle approaching an intersection which is disposed on one of the roads leading to the intersection, and an indicating device controlled by the sensing means which and disposed on the other road. Thus, information of a vehicle approaching the intersection along one road is indicated to drivers and other people approaching the intersection along the other road.

According to the present invention, when the sensing device detects a vehicle approaching the intersection, the indicating device indicates such information to a driver of a vehicle on the other road, for example, by cyclically switching a lamp on and off, and the driver will unfailingly notice the traffic stop sign and thereby stop the vehicle. Thus, collision at the intersection can be prevented.

DESCRIPTION OF THE PREFERRED EMBODIMENTS

First Embodiment

Figure 1:
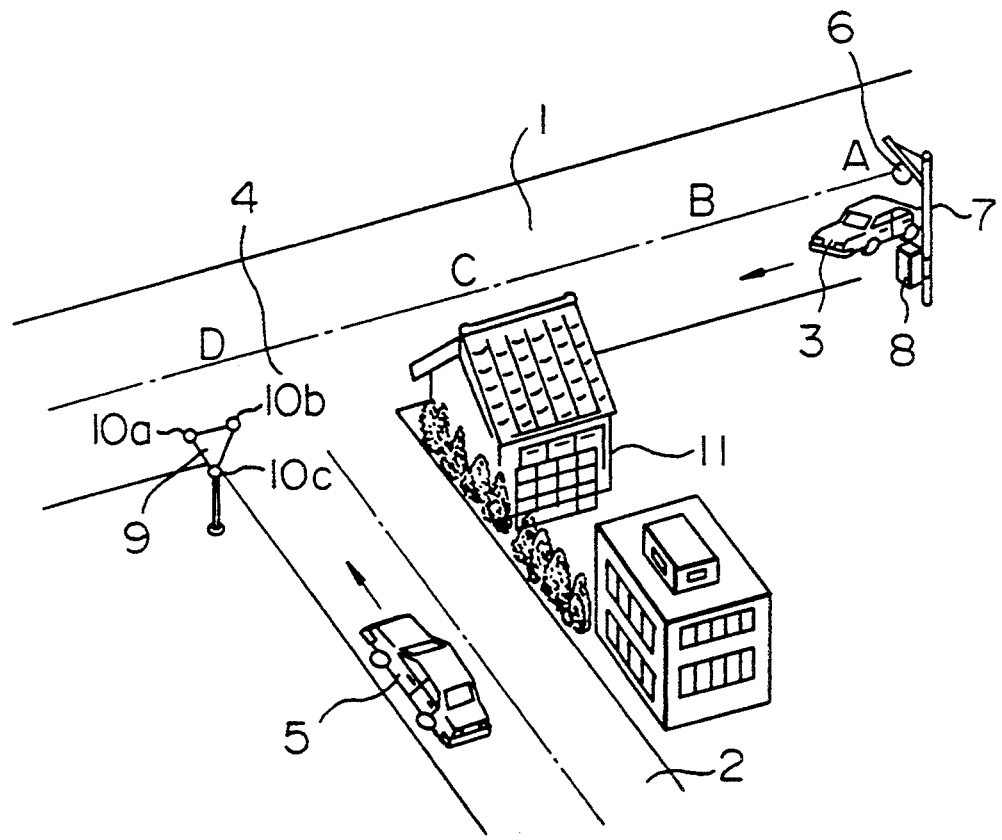
FIG. 1 illustrates an indicating apparatus for preventing vehicles from colliding with each other as they pass, according to the first embodiment of the present invention.
Figure 2:
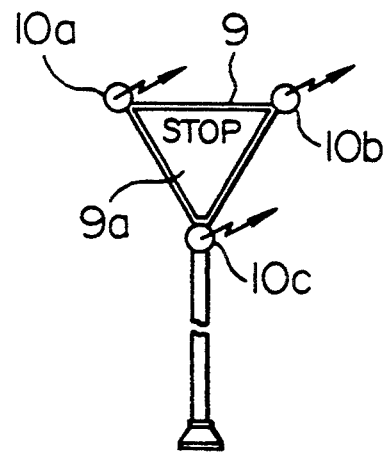
FIG. 2 is a front view of an alarm indicating board according to the first embodiment of the present invention.

Referring to FIG. 1, reference numeral 1 denotes a road having traffic preference (referred to as "a main road"), reference numeral 2 denotes a road on which a vehicle must stop temporarily (referred to as "an subsidiary road"). The main and subsidiary roads 1, 2 cross at a T-shaped intersection 4. A vehicle 3 approaches the intersection 4 along the main road 1, and a vehicle 5 approaches the intersection 4 along the subsidiary road 2. A vehicle sensor 6 is provided on a supporting pole 7 placed on the main road 1 a certain distance away from the intersection 4. A controller 8 is provided on the supporting pole 7. The controller 8 actuates the vehicle sensor 6 and processes sensing signals. An alarm indicating board 9 is provided on the subsidiary road 2 is disposed in the vicinity of the intersection 4, and is provided with a "STOP" traffic sign 9a. As shown in FIG. 2, lamps 10a, 10b and 10c are provided along the periphery of the alarm indicating board 9 and are switched on and off when the vehicle sensor 7 detects a vehicle running on the main road 1. Visual obstructions 11, such as a house and trees, stand along the subsidiary road in the vicinity of the intersection 4 so that it is hard for the driver in the vehicle 5 to see vehicle 3.

Figure 3:
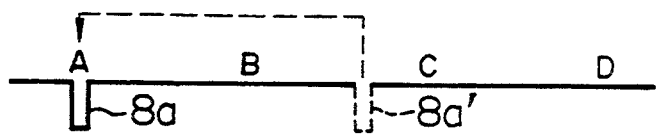
FIG. 3 is a timing chart illustrating the operation of indication according to the first embodiment of the present invention.
Figure 3:
Figure 3:
Figure 3:

Operation of the approaching vehicle indicating apparatus thus constructed and placed will be described below with reference to FIG. 3 showing a flowchart of switching-on and off period of time.

When the vehicle 3 passes a point A under the vehicle sensor 6, the sensor 6 detects the vehicle 3 and feeds signals to the controller 8. Then, the controller 8 operates to output a vehicle sensing signal 8a as shown by a chart (a) in FIG. 3. The lamps 10a to 10c are switched on and off in a period of time shown by charts (b) to (d). The lighting of the lamps 10a to 10c continues until the vehicle 3 passes a point D in the intersection 4.

If the distance between the points A and D in FIG. 1 is 100 m and the speed of the vehicle 3 is 30 to 60 km/h, the vehicle 3 travels from the point A to the point D in six to twelve seconds. Therefore, twelve seconds is appropriate for the lamps 10a to 10c to be switched on and off, in order to ensure safety. If another vehicle passes the point A under the vehicle sensor 6 before the vehicle 3 passes the point D, e.g. while the vehicle 3 is traveling between points B and C, the controller 8 outputs a vehicle sensing signal 8a' shown in FIG. 3, and the lamps 10a to 10c start the lighting (switching on and off) cycle again.

As described above, if the vehicle sensor 6 detects the vehicle 3 approaching the intersection 4 along the main road 1, the controller 8 outputs a vehicle sensing signal 8a to serially and cyclically flash the lamps 10a to 10c of the alarm indicating board 9. Therefore, according to the first embodiment of the present invention, since the lamps 10a to 10c are switched on and off to indicate the approach of the vehicle 3 to the intersection 4 along the main road 1, the driver of the vehicle 5 on the subsidiary road 2 is substantially sure to notice this and to thereby stop the vehicle without actually seeing the vehicle 3 coming along the main road 1 behind the visual obstructions 11. Thus, collisions caused by carelessness or habituation of drivers are substantially prevented.

Second Embodiment

Figure 4:
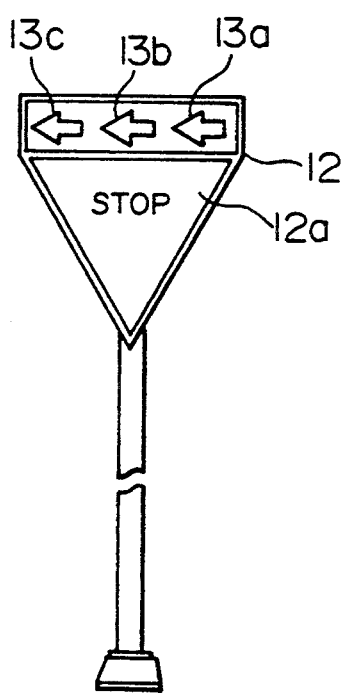
FIG. 4 is a front view of an alarm indicating board according to the second embodiment of the present invention.

Referring to FIG. 4, an alarm indicating board 12 according to the second embodiment of the present invention comprises a "STOP" traffic sign 12a and arrow-shaped lamps 13a to 13c provided above the traffic sign 12a. The other parts of the approaching vehicle indicating apparatus according to this embodiment are substantially the same as those of the first embodiment.

Figure 5:
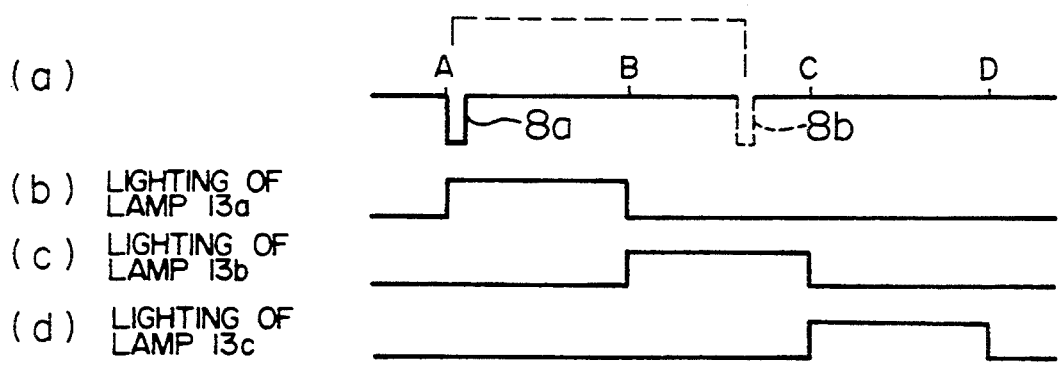
FIG. 5 is a timing chart illustrating the operation of indication according to the second embodiment of the present invention.

In the same way as in the first embodiment, if the vehicle 3 passes the point A under the vehicle sensor 6, the controller 8 outputs the vehicle sensing signal 8a. According to the vehicle sensing signal 8a, the lamp 13a is switched on and off in a period of time shown by the chart (b) in FIG. 5. When the vehicle 3 passes the point B, the lamp 13b is switched on and off in another period of time shown by a chart (c) in FIG. 5. Then, when it passes the point C, the lamp 13c is switched on and off in a still another period of time shown by a chart (d) in FIG. 5. Finally, when it passes the point D, the lamp 13c is switched off. If another approaching vehicle is detected at the point A by the vehicle sensor 6 while the vehicle 3 is travelling between the points B and C, the lamp 13a is switched on and off while the lamp 13b remains switched on and off. In other words, another lighting cycle starts following the first cycle.

Therefore, while the vehicle 3 is travelling between the points C and D and the other vehicle between the points B and C, the lamps 13c and 13d are switched on and off. The length of one cycle of lighting of the lamps 13a, 13b and 13c is determined in the same way as in the first embodiment. Also, each of the distances between A and B, between B and C and between C and D is one third of the distance between A and D.

Using the approaching traffic indicating apparatus of the second embodiment, the driver of the vehicle 5 on the subsidiary road can judge whether there are any vehicles approaching the intersection along the main road and whether, if there is a vehicle approaching, there is any other vehicle coming behind it, even if buildings, trees, etc., obstruct the visual field of a driver. Thus, the apparatus contributes to prevent collisions from occurring due to carelessness or habituation of drivers and to ensure driving safety at an intersection.

Third Embodiment

Figure 6:
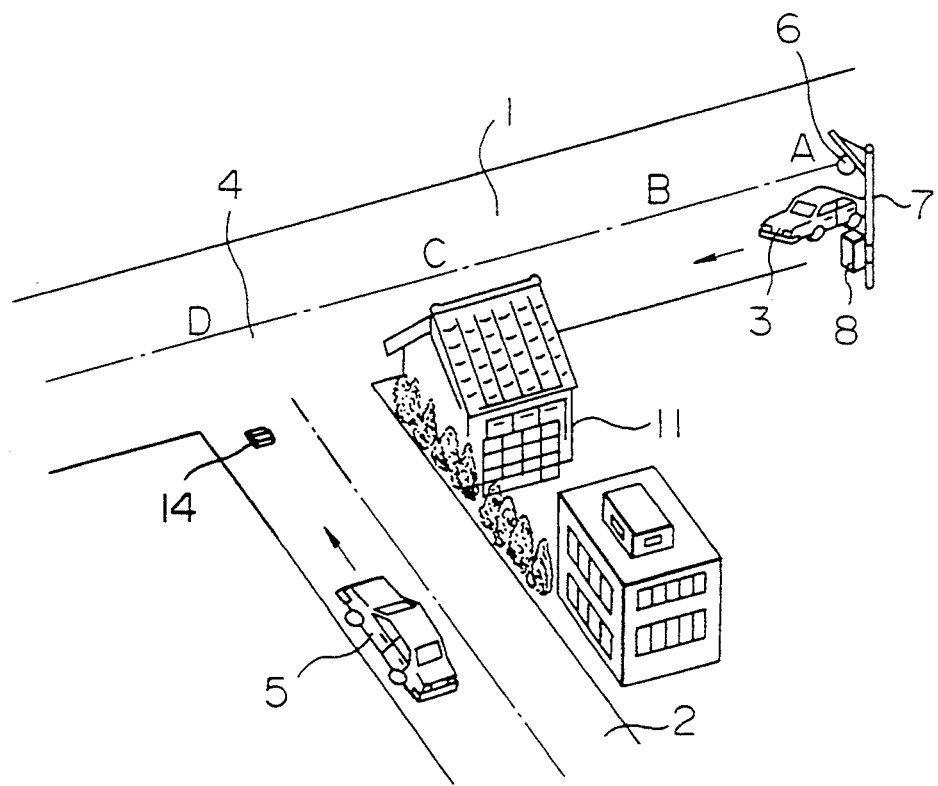
FIG. 6 illustrates an indicating apparatus for preventing vehicles from colliding with each other as they pass, according to the third embodiment of the present invention.
Figure 7:
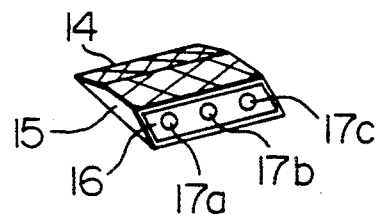
FIG. 7 is a perspective view of an alarm indicating device according to the third embodiment of the present invention.

FIG. 6 illustrates an intersection and positioning of an approaching vehicle indicating apparatus according to the third embodiment, in which the objects and parts which are the same as those in FIG. 1 are denoted by the same numerals. FIG. 7 illustrates an alarm indicating device according to the third embodiment.

As shown in FIG. 6, a feature of the third embodiment is that an alarm indicating device 14 for indicating the approach of a vehicle 3 along a main road 1 is half-buried in subsidiary road 2 immediately before an intersection 4.

As shown in FIG. 7, the alarm indicating device 14 includes: a casing 15; a glass window 16 provided on a side portion of the casing 15 which window just faces an approaching vehicle 5; and lamps 17a, 17b and 17c arranged in an opposed relation to the glass window 16.

In the same way as in the foregoing embodiments, according to the third embodiment, if the vehicle sensor 6 detects the vehicle 3 passing by, the controller 8 outputs a vehicle sensing signal 8a. According to the signal 8a, the lamps 17a to 17c are cyclically switched on and off to indicate the approach of the vehicle 5. The driver of the vehicle on the subsidiary road 2 is substantially sure to notice the cyclically flashing lamps and understand that there is a vehicle approaching the intersection 4 along the main road 1. Thus, the approaching vehicle indicating apparatus according to the third embodiment ensures that driver of a vehicle on the subsidiary road will stop the vehicle.

While the present invention has been described with respect to what is presently considered to be the preferred embodiments, it is to be understood that the invention is not limited to the disclosed embodiments and is intended to cover various modifications and equivalent arrangements included within the spirit and scope of the appended claims. For example, alarm indicating device may be provided on a main road, and vehicle sensing device may be provided on the subsidiary road.

What is claimed is:

1. An indicating apparatus for preventing vehicles from colliding as they pass through an intersection having visual obstructions, the intersection including a first road on which vehicles do not stop before passing through the intersection and a second road on which vehicles must temporarily stop before entering the intersection, the apparatus comprising:

vehicle sensing means located along the first road a predetermined distance from said intersection for detecting vehicles approaching said intersection on the first road;

alarm indicating means located at a predetermined point on the second road; and control means for causing said alarm indicating means to Actuate an alarm for a predetermined interval of time after said vehicle sensing means detects a first vehicle approaching said intersection on the first road and for causing said alarm indicating means to continue actuating said alarm if said vehicle sensing means detects a second vehicle approaching said intersection on the first road before said first vehicle has passed said intersection.

2. An indicating apparatus according to claim 1, wherein said alarm indicating means comprises a "STOP" traffic sign and at least one lamp provided in the vicinity of said traffic sign which is switched on and off in response to the control means.

3. An indicating apparatus according to claim 1, wherein said alarm indicating means comprises a "STOP" traffic sign and at least one arrow-shaped lamp provided in the vicinity of said traffic sign which is switched on and off in response to the control means.

4. An indicating apparatus according to claim 1, wherein said alarm indicating means comprises at least one lamp switched on and off in response to the control means and half-buried in the second road immediately before said intersection.

5. An apparatus for signalling a traffic condition at an intersection, comprising:
- a sensor for sensing vehicles travelling on a first road passing through the intersection, the first road having traffic preference such that the vehicles do not stop before passing through the intersection;
- an indicating device located at a predetermined position along a second road on which vehicles must temporarily stop before passing through the intersection;
- a controller, coupled to the sensor, for controlling the indicating device for a first predetermined period of time after a first vehicle is sensed travelling on the first road and for controlling the indicating device for a second predetermined period of time after a second vehicle is sensed travelling on the first road if the second vehicle is sensed during the first predetermined period of time.

6. The apparatus according to claim 5, wherein the indicating device includes a light which is switched on and off in response to the controller.

7. The apparatus according to claim 6, wherein the indicating device further includes a STOP sign with the light.

8. The apparatus according to claim 6, wherein a portion of the indicating device is buried in the second road.

9. The apparatus according to claim 6, wherein the indicator device includes a plurality of lights which are cyclically flashed in response to the controller.

10. The apparatus according to claim 5, wherein the indicating device includes an arrow-shaped light which is switched on and off in response to the controller.

11. The apparatus according to claim 10, wherein the indicating device further includes a STOP sign with the arrow-shaped light.

12. The apparatus according to claim 10, wherein the indicator device includes a plurality of arrow-shaped lights which are cyclically flashed in response to the controller.

13. A method for signalling a traffic condition at an intersection comprising the step of:
- sensing vehicles travelling on a first road passing through the intersection, the first road having traffic preference such that the vehicles do not stop before passing through the intersection;
- indicating for a first predetermined period of time at a predetermined position along a second road that a first vehicle has been sensed travelling on the first road, the vehicles traveling on the second road temporarily stopping before passing through the intersection; and
- indicating for a second predetermined period of time at the predetermined position along the second road when a second vehicle has been sensed travelling on the first road during the first predetermined period of time.

14. The method according to claim 13, wherein the step of indicating includes switching a light on and off.

15. The method according to claim 13, wherein the step of indicating includes cyclically flashing a plurality of lights.

* * * * *